United States Patent Office

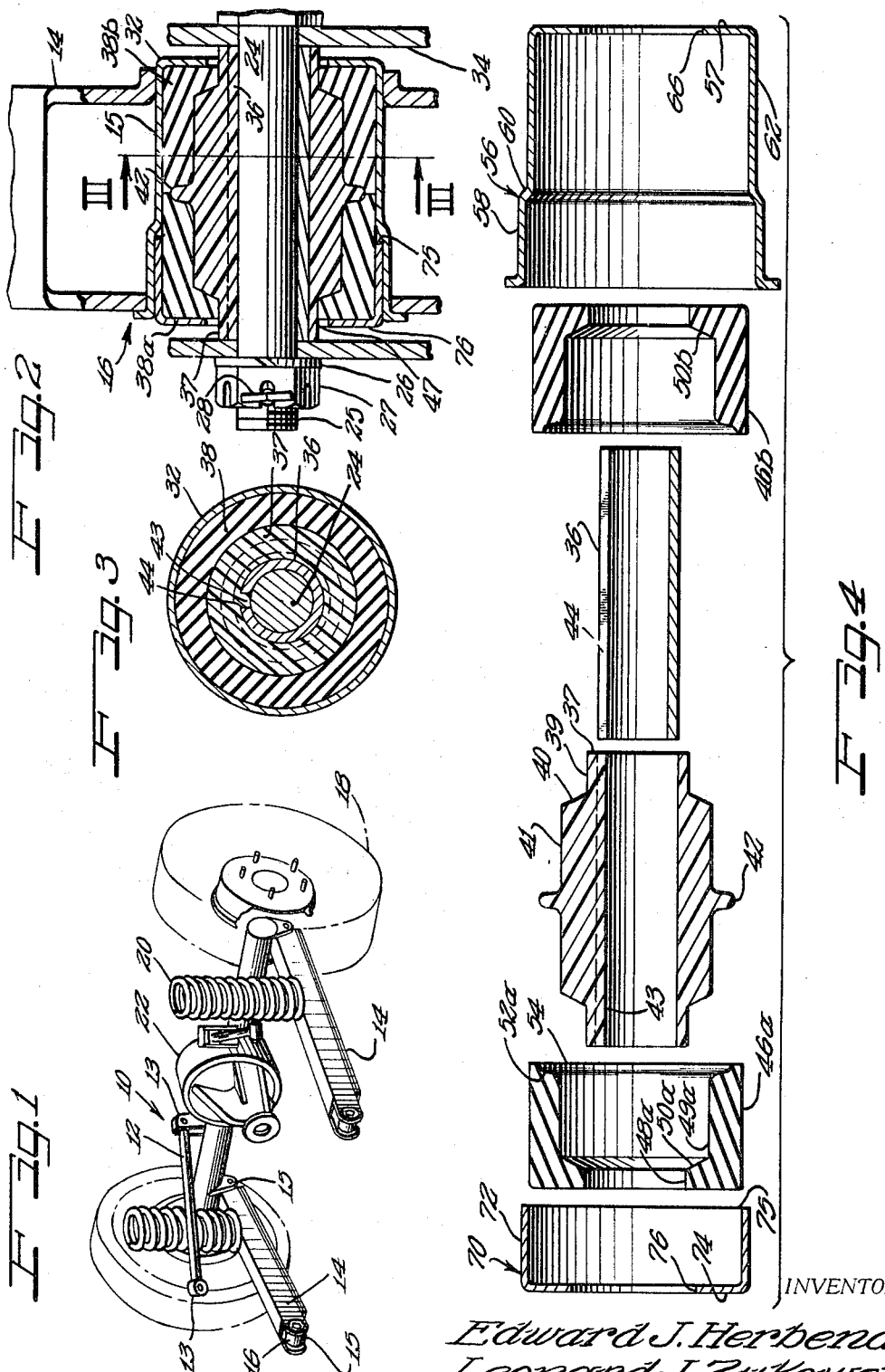

3,392,971
Patented July 16, 1968

3,392,971
SUSPENSION BUSHING
Edward J. Herbenar and Leonard J. Zukowski, Detroit, Mich., assignors to TRW, Inc., Warren, Mich., a corporation of Ohio
Filed Feb. 28, 1967, Ser. No. 619,306
10 Claims. (Cl. 267—54)

ABSTRACT OF THE DISCLOSURE

A bushing assembly useful in automotive wheel suspensions, having an inner sleeve for securing a pin, a bearing embracing the sleeve and having a radial ring projection, an elastomeric bushing of two-piece construction embracing the bearing and symmetrical about the ring, and a housing including a metal sleeve and a cap.

---

This invention relates to a pin-type bushing assembly and is more particularly directed to a preloaded assembly of such construction as to insure relative turning movement between elements of the assembly with a minimum torque requirement to provide constant turning torque through all angles while providing vibration and noise isolation and controlled deflection per load axially and radially.

In the prior art there are shown pin-type bushing assemblies having built-in self-lubricating characteristics that greatly prolong the useful service life of the assembly. Such devices are known which have a bushing within a bearing and confine relative rotational movement to the conforming surfaces of the bearing member and an outer sleeve.

The present invention provides a plastic bearing such as polyethylene, nylon or the like which rotates in the bushing. Specifically, the bearing has a radial ring adapted to engage a depression in the two-piece bushing within which the bearing fits. Within the bushing are longitudinal grooves containing lubricant for smoothing the contact with the bearing. The bushing fits in an outer sleeve having a cap adapted to house the assembly.

It is an object of the invention to provide an improved pin-type bushing assembly construction having built-in self-lubricating characteristics that greatly prolong the useful service life of the assembly and that eliminates the need of close tolerances.

A further object of the invention is to provide a bearing having a ring-like radial projection adapted to engage a depression in a two-piece bushing to provide constant turning torque through all angles while providing vibration and noise isolation and controlled deflection per load axially and radially.

Still other and further objects and features of the present invention will become apparent to those skilled in the art from a consideration of the following specification and the accompanying drawings, wherein On the drawings:

FIG. 1 is a fragmentary elevational view of a rear suspension system of a vehicle illustrating use of the invention;

FIG. 2 is a fragmentary longitudinal sectional view of a pin-type bushing assembly embodying the principles of the invention;

FIG. 3 is a cross-sectional view taken substantially along the line III—III of FIGURE 2; and FIG. 4 is an exploded view illustrating the elements of the assembly and their relationship to one another.

As illustrated in FIG. 1, there is shown the environment for a specific use of the bushing assembly of this invention in an automobile coil-spring rear suspension system 10. An upper and lower control arm 12, 14 contain at their ends 13, 15, a bushing assembly 16. The assembly 16 is also usable in a front suspension system and would be mounted at the pivot points of the upper and lower control arms (not shown).

The control arms 12, 14 are the means to control position and the connection of the sprung and unsprung parts of the vehicle. Swinging of the arms 12, 14 is necessary to allow for the vertical movement of the wheel assembly 18 in suspension movement and isolation is desirable to eliminate vibration and noise from transmitting from the unsprung to the sprung portions of the car.

The bushing assembly 16 will be disclosed with respect to the control arm 14, although it is usable in other joints as discussed above. On the lower control arm 14 is mounted a spring and shock absorber assembly 20 for connection to the vehicle. The control arm 14 is connected at one end to an axle 22.

As illustrated in FIGS. 1 and 2, the arm 14 has bifurcated ends providing spaced parallel ears or side walls 14a, 14a which are apertured at 14b to receive the bushing assembly 16. The assembly 16 carries a pin or bolt 24 extending through the bushing assembly 16 and having an integral head 24a at one end and an opposite externally threaded end 25 receiving a washer 26 and having a castellated nut 27 threaded thereon and locked in place with a cotter pin 28.

The bifurcated ends of the arm 14 are straddled by ears or brackets 34, 34 of the axle 22 at one end and from the sprung member or frame (not shown) at the other end. The pin 24 serves to connect these ears or brackets 34 with the bushing assembly 16.

As shown in FIGS. 2–4, a split cylindrical sleeve 36 embraces the pin 24, but is shorter than the pin so that its ends terminate intermediate the ends of the pin and bear against the brackets or ears 34, 34 when the nut 27 is tightened.

A bearing member 37 of generally cylindrical configuration and composed of a plastic such as polyethylene embraces the sleeve 36. This bearing member 37 has reduced diameter cylindrical end portions 38 extending from the ends thereof to annular inclined shoulders 40 which extend to the main outer diameter 41 of the bearing. A radial ring-like projection 42 is formed centrally and radially around the major diameter portion 41 of the bearing. The bearing has a cylindrical bore therethrough with a longitudinally extending rib or key 43 seated in the cleft gap 44 of the sleeve 36.

A two part elastomer bushing composed of cup-like halves 46a and 46b embraces the bearing 37. The bushing 46 is preferably composed of rubber. Since the cup-like parts 46a and 46b are identical, only one part 46a will be described and it will be understood that similar reference numerals with the subscript b will be applied to the other part 46b. The part 46a comprises a thimble-like member with a small diameter bore 48a at one end thereof and a larger diameter bore 49a therethrough and connected to the bore 48a by an inclined shoulder 50a. The bore 48a has a diameter substantially the same as the end portion 38 of the bearing 37 to snugly receive the bearing end portion therethrough. The bore 49a snugly embraces the main central diameter portion 41 of the bearing 37. The bore 49a has an enlarged mouth providing a shoulder 52a so that when the part 46a is seated on the bearing 37, this mouth will receive the projection 42 and the shoulder 52a will engage one side of the projection.

The amount of deflection radially and axially is controlled by the size of the projection ring 42 around the bearing 37. It is used to control the rate of deflection axially and radially by its size in conjunction with the ability of the elastomer bushings 46a and 46b to deform and also to limit the amount of deflection radially positively. Additional projections may be added for additional control. The bushing assembly is self-sealing at area 47 by the elastomer bushings 46a and 46b. The bearing 37 rotates in the bushing 46.

The bearing member 37 is preferably formed of a plastic. For example, a synthetic organic plastic having resistance to deformation and to attack by oils and greases and having self-lubricating properties can be used, such as nylon, which is a linear polymeric amide; "Celcon," which is a copolymer of trioxane; "Delrin," which is an acetyl resin or a polymerized formaldehyde resin; "Marlex," which is a polyethylene; and polyurethanes. In general, a polymer resin or other synthetic plastics should be selected that is self-lubricating and has a high degree of flexibility and considerable elasticity, together with high tensile strength and resistance to flow into moderate loading pressures, inertness to oils and greases or other lubricants and capable of being molded.

An outer cup-like sleeve 56 formed of thin walled rigid material, preferably metal, surrounds the bushing 46. The outer sleeve 56, as shown in FIG. 4, is generally cylindrical, but formed at its right end with an inturned annular flange 57 and near its left end with a relatively short enlarged cylindrical portion 58 smoothly offset as at 60 from the major cylindrical wall portion 62. The enlarged wall portion 58 terminates in an outwardly turned radial flange 64. The outer sleeve 56 is suitably formed of a low carbon steel by a drawing or press-punch operation as an integral unit.

As shown in FIG. 2, the outer sleeve 56 snugly receives the bushing 46 with the right flanged end 57 of the sleeve abutting against the right end of the bushing member 46b and freely receiving the bearing neck portion 38. The sleeve 56 in turn is snugly and non-rotatably received within the cylindrical socket 68 formed in the member 34 with the sleeve 56 resting against the annular edges of the member 34.

A cap 70 cooperates with the sleeve 56. It is formed with a longitudinally extending short cylindrical wall 72. The cap member 70 includes at its upper end a radially inturned flange 74 providing an opening 76 of greater diameter than the left neck portion 38 of the bearing member 37, thereby providing a clearance for the bearing.

The outside diameter of the cap 70 is slightly greater than the inside diameter of the cylindrical portion 58 of the sleeve 56, whereby when the cap 70 is forced into the interior of the left cylindrical wall portion 58, endwise pressure is placed on the bushing 46 and through the bushing 46 to the bearing 37.

The length of the cylindrical wall 72 of the cap portion 70 is somewhat less than the length of the enlarged wall portion 58 of the outer sleeve 56 with the result that the end 75 of the cap member 70 terminates just short of the inner surface of the offset portion 60 of the outer sleeve 56. By reason of this construction and the pressure fit relationship between the cap member 70 and the enlarged wall portion 58 of the outer sleeve 56 of the act of assembling the outer sleeve and cap in place as shown in FIG. 2 results in the loading of the bushing and bearing.

FIG. 4 shows an expanded view of the bushing and indicates the manner of assembly of the bushing. The inner sleeve 36 and the bearing 37 are an integral unit attached by slot 44 and projection 43. Two identical halves of an elastomer bushing 46 with a lubricant on the inner diameter are placed over the bearing 37. This unit is placed in the outer sleeve 56 and the cap 70 is pressed into the outer sleeve 56 to retain the bushing 46 and provide a specified amount of preload on the bushing 46 in order to attain a desired turning torque. The inner sleeve 36 and bearing 37 rotate as a unit with the aid of a lubricant within the unit of the bushing 46, outer sleeve 56 and cap 70. The bearing 37 has a projection 42 about its circumference to control the axial and radial deflection per an applied load as disclosed above. The bushing 46 is constructed with a number of grooves 54 equally spaced on the inside diameter. The grooves 54 are for the storage of lubricant and to permit a given amount of radial deflection per load.

Summarizing, the novel feature of this bushing is the constant turning torque through all angles for providing vibration and noise isolation and controlled deflection per load axially and radially.

The amount of deflection radially and axially is controlled by the size of the projection ring 42 around the bearing 37. It is used to control the rate of deflection axially and radially for its size in conjunction with the elastomer bushings 46, ability to deform and also to limit the amount of deflection radially positively. Additional projections may be added for additional control. The bushing assembly is self-sealing at area 47 by the elastomer bushing 46.

It will be understood that modifications and variations may be effected without departing from the scope of the novel concepts of the present invention.

We claim:

1. A constant torque pin bushing for wheel suspension arms and the like adapted to be pressed into apertures of said arms which comprises:
   a cup-like casing having an opening through the bottom thereof and an outturned flange around the mouth thereof;
   an apertured cap pressed in the mouth of the casing;
   a plastic bearing in the casing having reduced ends projecting through the bottom of said casing and said cap;
   a split inner sleeve;
   a pair of opposed elastomer cups in the casing embracing the bearing;
   and a radial flange on the bearing between the mating ends of the elastomer cups, the ends of said bearing and said inner sleeve adapted to be abutted by said suspension arms and the split sleeve adapted to mount a pin extending through said suspension arms.

2. A constant torque pin bushing as recited in claim 1, wherein
   there are grooves on the inner diameter of said bushing extending in an axial direction to retain lubricant.

3. A constant torque pin bushing as recited in claim 1, wherein
   said radial flange engages a depression in said cups.

4. A constant torque pin bushing as recited in claim 3, wherein
   said cups are symmetrical with respect to said bearing flange.

5. A constant torque pin bushing as recited in claim 1, wherein
   said pin is formed with a threaded end and secured by a bolt, whereby said bushing assembly is adapted to provide constant turning torque through all angles while providing vibration and noise isolation and controlled deflection per load axially and radially.

6. A constant torque pin bushing as defined by claim 1, wherein
   said bearing has a projection on its inner diameter extending in an axial direction to lock said bearing to said inner sleeve.

7. A constant torque pin bushing as defined in claim 1, wherein
   said elastomer cups are polyethylene.

8. The method of making a constant torque pin bushing for wheel suspension arms and the like adapted to be pressed into apertures of said arms which includes
   the steps of forming a bearing with a radial flange, placing said bearing within a pair of symmetrical cups adapted to be joined at said bearing projection, and inserting said bushing and bearing within an outer sleeve and cap.

9. The method of making a bushing as recited in claim 8, which includes
the step of forming said cups with slots to contain lubricant.

10. The method of making a bushing as recited in claim 8, which includes
the step of providing a pin to fit within said bearing, such that the bearing now rotates in said bushing for constant turning torque through all angles while providing vibration and noise isolation and controlled deflection per load axially and radially.

References Cited

UNITED STATES PATENTS

| | | | |
|---|---|---|---|
| 3,039,831 | 6/1962 | Thomas | 267—54 |
| 3,147,964 | 9/1964 | Wolf | 267—54 |

FOREIGN PATENTS 160,238  12/1954  Australia.

ARTHUR L. LA POINT, *Primary Examiner.*

R. M. WOHLFARTH, *Assistant Examiner.*